(12) United States Patent
Acuna et al.

(10) Patent No.: US 9,191,267 B2
(45) Date of Patent: Nov. 17, 2015

(54) DEVICE MANAGEMENT FOR DETERMINING THE EFFECTS OF MANAGEMENT ACTIONS

(71) Applicant: International Business Machines Corporation, Armonk, NY (US)

(72) Inventors: Jorge D. Acuna, Vail, AZ (US); Ezequiel Cervantes, Tucson, AZ (US); Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/628,734

(22) Filed: Sep. 27, 2012

(65) Prior Publication Data

US 2014/0089482 A1 Mar. 27, 2014

(51) Int. Cl.
*H04L 12/24* (2006.01)
*G06Q 10/00* (2012.01)

(52) U.S. Cl.
CPC .............. *H04L 41/00* (2013.01); *G06Q 10/00* (2013.01); *H04L 41/12* (2013.01); *H04L 41/145* (2013.01); *H04L 41/147* (2013.01)

(58) Field of Classification Search
CPC ..... G06F 15/173; H04L 41/00; H04L 41/145; H04L 41/147; H04L 41/12
USPC ................ 709/220, 223, 224; 703/13, 20, 21; 714/28
See application file for complete search history.

(56) References Cited

U.S. PATENT DOCUMENTS

| | | | |
|---|---|---|---|
| 6,553,416 B1 * | 4/2003 | Chari et al. ................... 709/224 |
| 7,225,117 B1 * | 5/2007 | Feldstein et al. ................ 703/21 |
| 7,729,288 B1 * | 6/2010 | Betker .......................... 370/254 |
| 2002/0169965 A1 * | 11/2002 | Hale et al. ..................... 713/182 |
| 2004/0122645 A1 * | 6/2004 | Shevenell et al. ............... 703/21 |
| 2008/0243858 A1 * | 10/2008 | Dos Remedios et al. ....... 707/10 |
| 2008/0301394 A1 | 12/2008 | Muppirala et al. |
| 2009/0271415 A1 * | 10/2009 | Galgali et al. ................ 707/100 |
| 2009/0319247 A1 * | 12/2009 | Ratcliffe et al. ................ 703/13 |
| 2012/0078566 A1 * | 3/2012 | Gintis et al. .................. 702/119 |

* cited by examiner

*Primary Examiner* — Patrice Winder
*Assistant Examiner* — Aye M Aung
(74) *Attorney, Agent, or Firm* — Alexander Jochym; Matthew Mottice

(57) ABSTRACT

Aspects of the present invention disclose a system, method and program product for determining the affects of management actions. In an example, a computer determines a connectivity between one or more devices within a management inventory that are connected via a network. The computer determines a connectivity between the one or more devices within the management inventory after a proposed management action. The computer determines the one or more devices affected by the proposed management action. The computer sends a query to the one or more devices affected by the proposed management action for specific impacts of the proposed management action. The computer receives data related to the specific impacts of the proposed management action from the one or more devices affected by the proposed management action.

18 Claims, 3 Drawing Sheets

DEVICE MANAGEMENT FOR DETERMINING THE EFFECTS OF MANAGEMENT ACTIONS

FIELD OF THE INVENTION

The present invention relates generally to device management and more specifically to device management for determining the effects of management actions.

BACKGROUND

Labs and other scenarios managed by platform management programs may include hundreds of devices, including servers, switches, storage systems, etc. In some management programs, management actions are executed centrally from a platform manager user interface and affect one or more devices from a single management action. Problems may arise in complicated environments where changes on one managed device affect other managed devices. For example, a fibre channel (FC) switch may control storage connectivity for many servers. Changing the active zone configuration on the FC switch may result in unwanted side effects, such as some servers losing input/output (I/O) connectivity to storage volumes. Another example would be removing a storage volume that will have a similar effect for those servers that rely on the data stored in the storage volume.

SUMMARY

Aspects of the present invention disclose a method, system and program product for device management for determining the effects of management actions.

Exemplary embodiments include a system, method and program product for determining the effects of management actions. In an example, a computer determines a connectivity between one or more devices within a management inventory that are connected via a network. The computer determines a connectivity between the one or more devices within the management inventory after a proposed management action. The computer determines the one or more devices affected by the proposed management action. The computer sends a query to the one or more devices affected by the proposed management action for specific impacts of the proposed management action. The computer receives data related to the specific impacts of the proposed management action from the one or more devices affected by the proposed management action.

DETAILED DESCRIPTION

Figure 1:
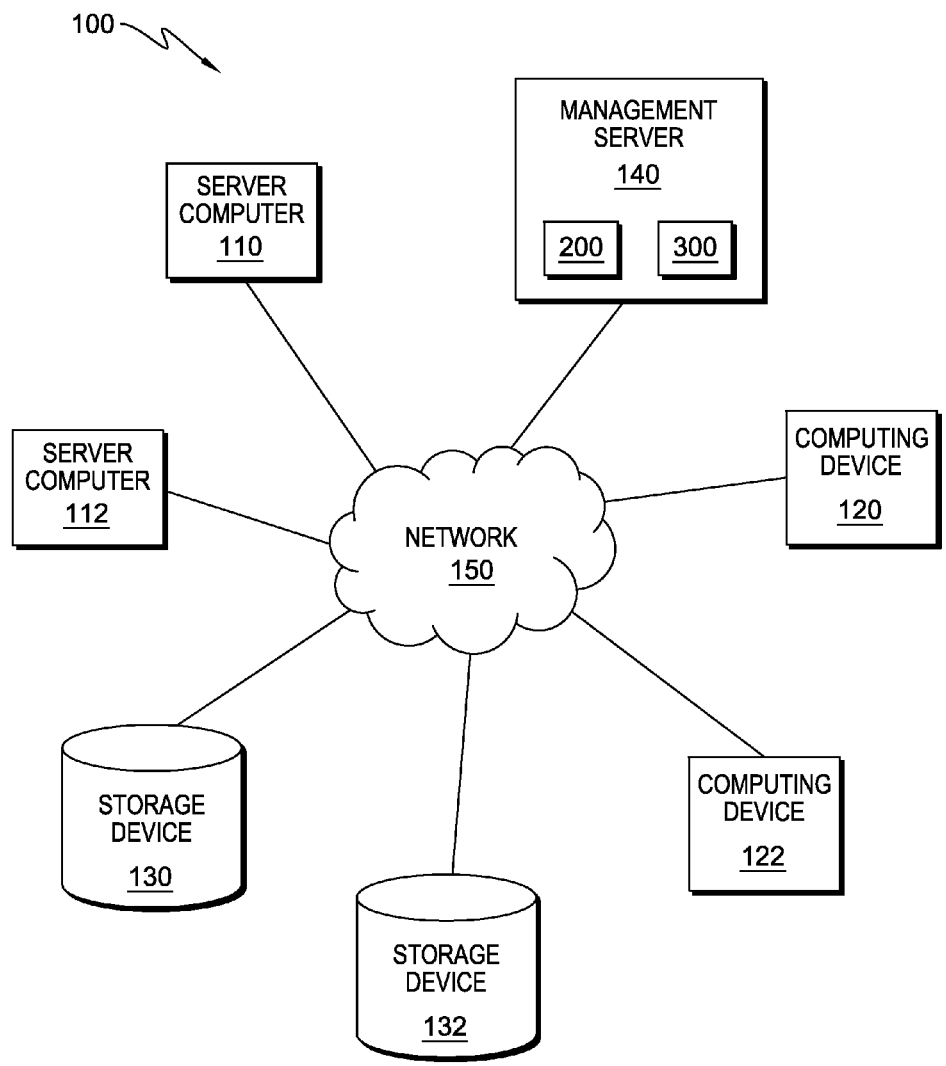
FIG. 1 depicts a block diagram illustrating a management environment for determining the effects of management actions to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process, such that the instructions which execute on the computer or other programmable apparatus provide processes for implementing the functions/acts specified in the flowchart and/or block diagram block or blocks.

The present invention will now be described in detail with reference to the figures. FIG. 1 depicts a block diagram illustrating a management environment, generally designated 100, for determining the effects of management actions according to an embodiment of the present invention. Management environment 100 includes server computer 110, server computer 112, computing device 120, computing device 122, storage device 130, storage device 132, and management server 140, all interconnected over network 150.

In the depicted example, network 150 is the Internet representing a worldwide collection of networks and gateways that use the Transmission Control Protocol/Internet Protocol suite of protocols to communicate with one another. In other examples, network 150 may also be implemented as a number of different types of networks, such as, but not limited to an intranet, a local area network (LAN), or a wide area network (WAN). Examples of network 150 include wire cables, wireless communication links, fiber optic cables, routers, switches, and/or firewalls. In general, network 150 can be any combination of connections and protocols that will support communications between server computer 110, server computer 112, computing device 120, computer device 122, storage device 130, storage device 132, and management server 140.

Server computer 110, server computer 112, computing device 120, computing device 122, or management server 140 may be a laptop computer, tablet computer, netbook computer, personal computer (PC), a desktop computer, a personal digital assistant (PDA), a smart phone, or any programmable electronic device capable of communicating via network 150. In other embodiments, server computer 110, server computer 112, computing device 120, computing device 122, or management server 140 may be, for example, a management server, a web server, or any other electronic device or computer system capable of receiving and sending data. In another embodiment, server computer 110, server computer 112, computing device 120, computer device 122, and/or management server 140 represent a "cloud" of computers interconnected by one or more networks, where server computer 110, server computer 112, computing device 120, computer device 122, and/or management server 140 is a primary server for a computer system utilizing clustered computers and components to act as a single pool of seamless resources when accessed through network 150. This is a common implementation for data centers in addition to cloud computing applications. Server computer 110, server computer 112, computing device 120, computing device 122 and management server 140 may include respective user interfaces (UIs) for interfacing with management program 200 and platform management program 300.

Management server 140 executes management program 200 for determining the effects of management actions. Management program 200 assesses the impact of management actions proposed by a user. Management program 200 analyzes the platform management inventory to detect affected devices due to a proposed management action. Management program 200 queries each of the affected devices and receives specific impacts of each of the affected devices. Management program 200 compiles a list of responses to give a user a detailed message about the specific impacts of each of the affected devices. Management program 200 may be a standalone program or may be integrated with a platform management program 300, such as IBM Systems Manager®. Exemplary embodiments of management program 200 provide the user with a more detailed message than current platform management programs that usually generate a generic warning when the current platform management program receives a request for a management action. The more detailed message may reduce the amount of mistakes that lead to severe problems like data loss and downtime when users request management actions that have adverse effects.

In exemplary embodiments, management program 200 provides the user with a more detailed message for different types of management actions that may occur. In some exemplary embodiments, the management actions include, but are not limited to: fabric zoning operations, virtual server deletion, storage volume deletion, logical unit number (LUN) masking operations, host configuration changes on the storage devices, and power off/on servers/switches/storage. In exemplary embodiments, a fabric zoning operation may affect the server to storage I/O and therefore can lead to non operational virtual and non virtual servers that depend on storage volume data. In exemplary embodiments, a virtual server deletion may affect access to a virtual server and/or any applications running on the virtual server, such as a database, web server, or any other application. In exemplary embodiments, a storage volume deletion may cause loss of data as well as non functioning servers that rely on the deleted data. In exemplary embodiments, LUN masking operations may cause I/O problems by removing server access to a storage volume or the LUN masking operation may give access to a server that should not be allowed to access such storage volume. In exemplary embodiments, a host configuration changes on the storage device may have a similar effect in which a set of defined server FC ports lose/gain access to a set of volumes. In exemplary embodiments, powering off and/or on devices render the device useless for the time the device is off until it is powered on and it becomes operational. Additional management operations are possible as long as the operation affects one or more devices.

In exemplary embodiments, management program 200 provides the user with a more detailed message for different types of devices that may be involved. In some exemplary embodiments, the different types of devices involved can be anything that is part of the IP and/or FC networks. The different types of devices can be physical or virtual devices such as servers, switches, storage devices. In exemplary embodiments, software applications such as databases, web servers, or custom application can be viewed as devices since the effect of stopping that software application may have unwanted effects that other devices may be interested in knowing.

Figure 2:
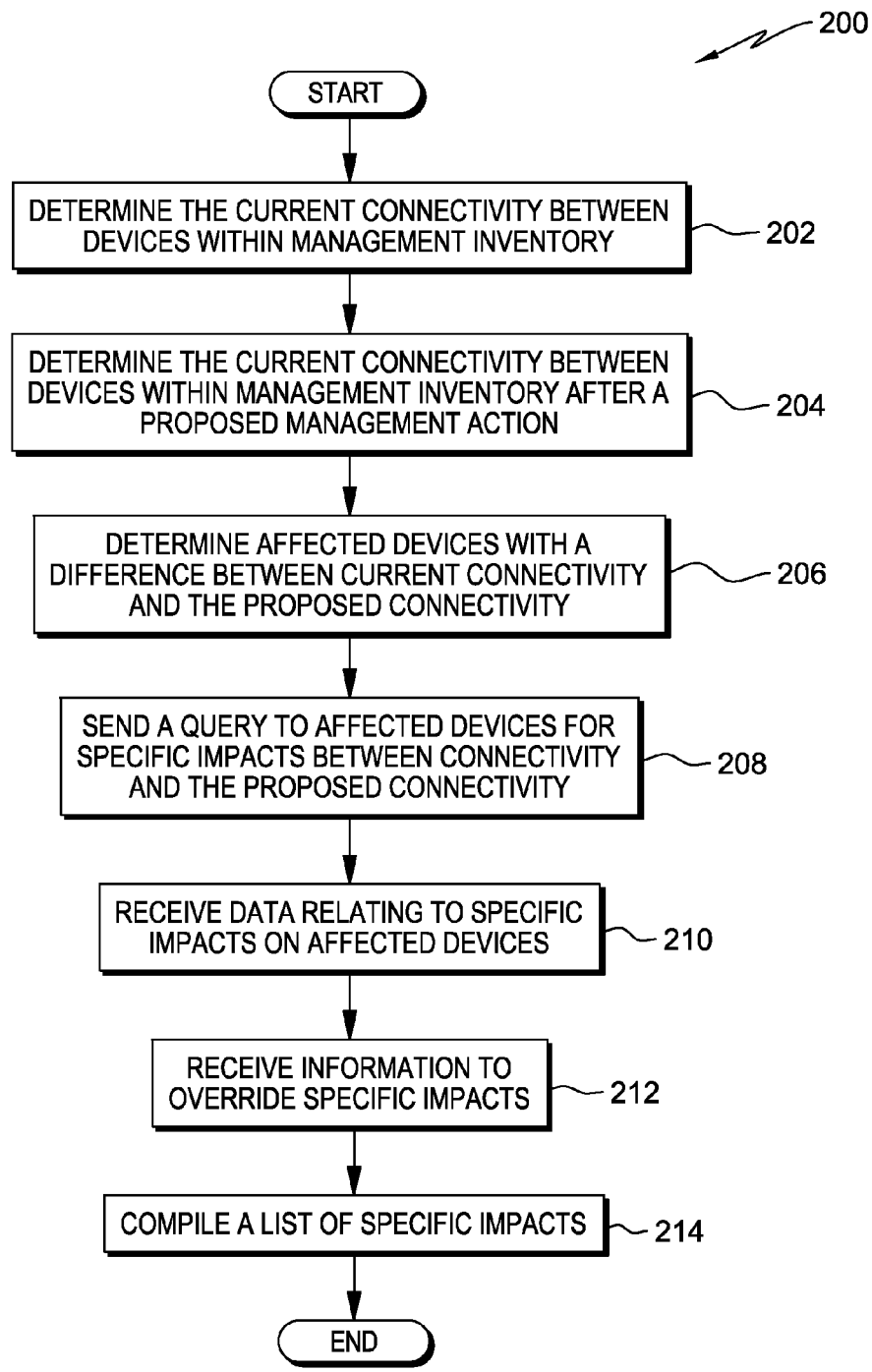
FIG. 2 is a flowchart illustrating a device management program installed in a computer of FIG. 1 for device management by platform management programs.

FIG. 2 is a flowchart illustrating the steps of management program 200 installed in a computer of FIG. 1 for device management by platform management programs 300.

In step 202, management program 200 determines a current connectivity between one or more devices within a management inventory of platform management program 300. In an exemplary embodiment, management program 200 determines the current connectivity between server computer 110, server computer 112, computing device 120, computing device 122, storage device 130, storage device 132 through network 150. In an example where platform management program 300 receives a request for a management action to change a zone for an FC switch, management program 200 determines the current connectivity by accessing a database on management server 140 that is associated with platform management program 300. In this example, the database on management server 140 includes inventory regarding what FC ports are included within each predetermined zone. The database on management server 140 may also include each server and storage device that also includes associated FC Ports, such as server computer 110 and server computer 112, and storage device 130 and storage device 132.

In step 204, management program 200 determines a connectivity between the one or more devices within the management inventory after a proposed management action. In an exemplary embodiment, management program 200 determines the connectivity between server computer 110, server computer 112, computing device 120, computing device 122, storage device 130, storage device 132 through network 150 after a proposed management action. In an example where platform management program 300 receives a request for a management action to change a zone for an FC switch, management program 200 determines the connectivity of the one or more devices by accessing a database on management server 140 that is associated with platform management program 300. In this example, the database on management server 140 includes inventory regarding what FC ports are included within each proposed zone. The database on management server 140 may also include each server and storage device that also includes associated FC Ports, such as server computer 110 and server computer 112, and storage device 130 and storage device 132. In this example, management program 200 may determine a delta between the current zone and the proposed zone.

In step 206, management program 200 determines which of the one or more affected devices may be affected from the proposed management action. In an exemplary embodiment, management program 200 determines which of the devices may be affected from the change in connectivity. In an example, management program 200 determines which of server computer 110, server computer 112, computing device 120, computing device 122, storage device 130, storage device 132 have a change in connectivity from the delta between the current zone and the proposed zone.

In step 208, management program 200 sends a query to affected devices for specific impacts from the proposed management action. In exemplary embodiments, each of the affected devices may have a program installed that determines specific impacts on the affected devices depending upon the proposed management action. In one example, since servers perform input/output on volumes, the specific impact for a server losing connectivity to a storage device is that the server will lose input/output access to a set of volumes. The set of volumes for each storage devices may be located through relationships found in the inventory database.

In one example, management program 200 determines that a ServerA will lose input/output access to a VolumeX. In this example, management program 200 sends a query to the ServerA asking for the specific impacts of losing access to the VolumeX. In this example, the ServerA includes an assessor program running on the ServerA that receives the query from management program 200 and determines the specific impacts for ServerA. Similarly, other affected devices may include programs that determine the specific impacts of the proposed management action. The assessor program or other similar programs may determine the specific impacts on the affected devices automatically. In an example, the assessor program running on the ServerA tracks the access frequency to each volume. If VolumeX has been accessed recently or frequently, then the assessor program determines that access to VolumeX is important and loss of access to VolumeX may have a high impact. The assessor program may determine that ServerA will lose access to VolumeX, which is frequently accessed. In other examples, additional information may be determined by the assessor program and sent to management server 140. Some examples of the additional information may be, but is not limited to: a value representing the severity of the determined specific impacts for each affected devices, the access frequency of a volume, the last access time, etc. In some examples, the assessor program may determine that the node does not have an impact, such as situations when a server has previously never accessed a volume that the server may lose due to a proposed management action.

In other examples, different types of proposed management actions may result in different types of responses from the queried devices. One example is the deletion of a volume. Management program 200 determines that the volume currently is LUN masked to more than one server. Management program 200 can also determine based on the inventory in storage device, such as storage device 130 or 132, what servers may be performing I/O to that volume. Management program 200 can also send a request to the assessor program on each of the affected servers to verify the impact of deleting the volume. The assessor program may determine that no I/O has been done in a certain period of time or that the FC ports are currently disabled. This information can then be presented to the user to decide if the user wishes to proceed with this management action.

In step 210, management program 200 receives data relating to the specific impacts on the affected devices. As aforementioned, the affected devices send management server 140 data related to the specific impacts to the affected devices. Management program 200 running on management server 140 receives the data relating to the specific impacts on the affected devices.

In step 212, management program 200 receives information to override the specific impacts on the affected devices. In an exemplary embodiment, a user may override the specific impacts determined by the assessor program running on each of the affected devices. In an exemplary embodiment, based on the data received relating to the specific impacts on the affected devices, the user inputs information through a user interface on management server 140 or other computing device to override the specific impacts on the affected devices. In an example, the backup VolumeZ of ServerX is written to infrequently, but is nonetheless critical to operation of ServerX. In this example, the assessor program may determine that VolumeZ is not that important because VolumeZ is not accessed frequently. However, the user determines that VolumeZ is important. In such a scenario, the user provides information through the user interface on management server 140 to reconfigure the impact of losing connectivity to VolumeZ, so that a better understanding is known for the total impact of the proposed management action.

In step 214, management program 200 compiles a compilation of specific impacts from the proposed management action. In exemplary embodiments, management program compiles a compilation of specific impacts in a format that is able to be displayed on management server 140 or another computing device that a user may view. In an example, management program 200 determined that ServerB would lose access to an infrequently accessed VolumeY due to a proposed management action. The severity of the loss for ServerB would be less than the severity of the loss for ServerA. The data received by management program 200 that the severity of the loss for ServerB would be less than the severity of the loss for ServerA would be compiled by management program 200, and may be presented to the user. In one example, the higher severity on ServerA may be listed first, and the lower severity on ServerB may be listed second. In this example, the highest severity message determines the impact of the proposed management action. In some exemplary embodiments where all affected devices determine there are no specific impacts, management program may not display any form or warning messages, or may display a message relating to the fact there are no specific impacts.

In an optional step, management program 200 determines if a user has clearance to allow the proposed management action to take place. In exemplary embodiments, management program 200 determines the clearance level of the user by accessing a profile associated with the user and comparing the profile to a predetermined threshold clearance level required to perform the proposed management action with a determined severity level of the affected devices. In an example, a lab technician with a low clearance level proposes a management action. In this example, management program 200 determines a high severity level for ServerA stemming from the proposed management action. In this example, management program 200 determines that the lab technician does not have the clearance level to proceed with the proposed management action, and management program 200 blocks the performance of the proposed management action.

Figure 3:
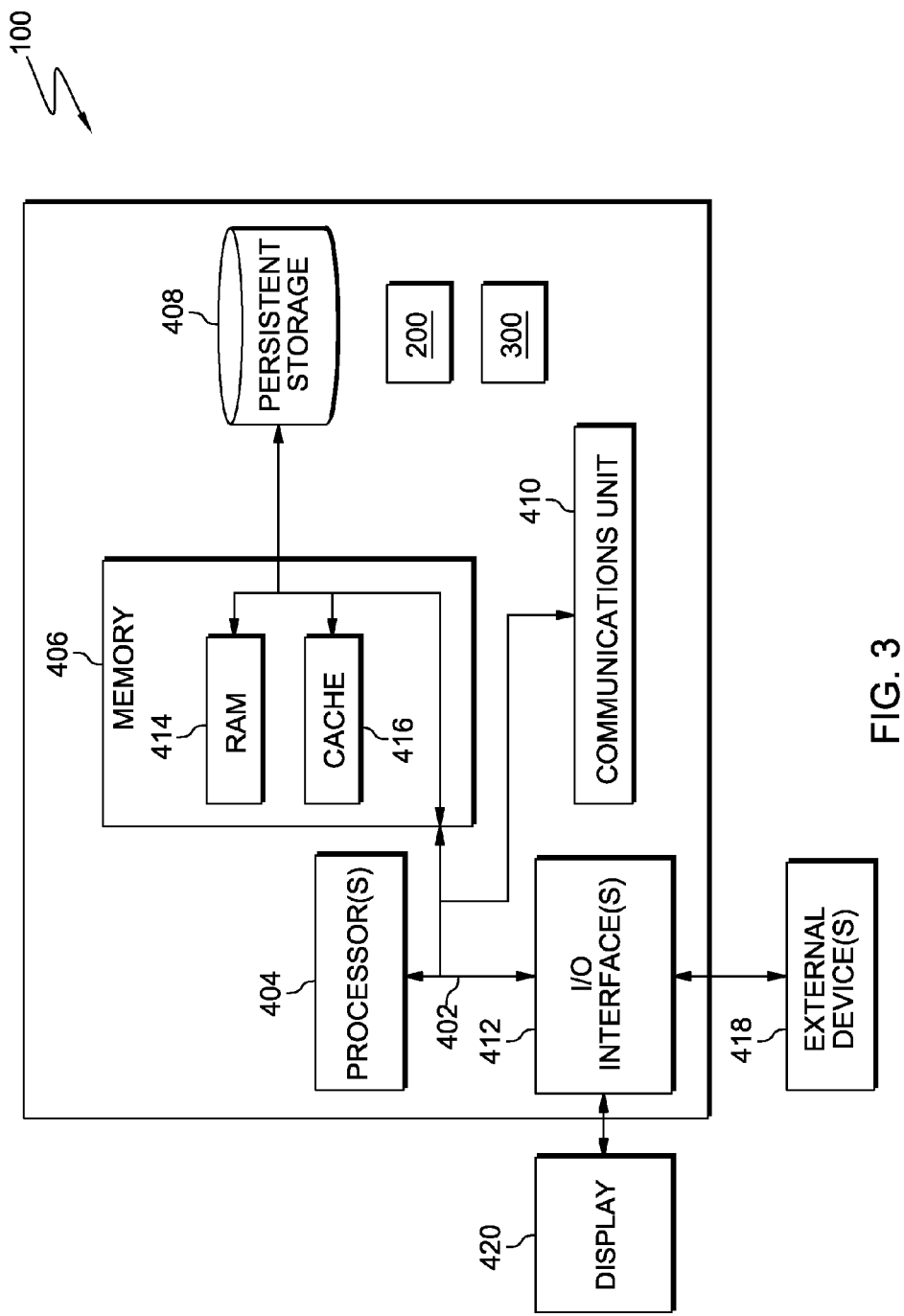
FIG. 3 depicts a block diagram of components of the computing devices within the management environment in accordance with an illustrative embodiment.

FIG. 3 depicts a block diagram of components of server computer 110, server computer 112, computing device 120, computing device 122, and management server 140 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 110, server computer 112, computing device 120, computing device 122, and management server 140 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Management program 200 and platform management program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including storage device 130 and storage device 132. In these examples, communications unit 410 includes one or more network interface cards. Communications unit 410 may provide communications through the use of either or both physical and wireless communications links. Management program 200 and platform management program 300 may be downloaded to persistent storage 408 through communications unit 410.

I/O interface(s) 412 allows for input and output of data with other devices that may be connected to server computer 110, server computer 112, computing device 120, computing device 122, and management server 140. For example, I/O interface 412 may provide a connection to external devices 418, such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., management program 200 and platform management program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining the affects of management actions, the method comprising:
   determining a connectivity between one or more devices within a management inventory that are connected via a network;
   determining a connectivity between the one or more devices within the management inventory after a proposed management action;
   determining the one or more devices affected by the proposed management action;
   sending a query to the one or more devices affected by the proposed management action for specific impacts of the proposed management action;
   receiving data related to the specific impacts of the proposed management action from the one or more devices affected by the proposed management action; and
   displaying a warning of the specific impacts of the proposed management action from the one or more devices affected by the proposed management action, wherein the warning displays the one or more devices affected by the proposed management action in a list in order of severity of the specific impacts.

2. The method of claim 1, wherein the proposed management action is a deletion of a volume.

3. The method of claim 1, wherein the proposed management action is a request to change a zone for an FC switch.

4. The method of claim 1, further comprising:
   determining that a user has clearance to allow the proposed management action to take place.

5. A computer program product for determining the affects of management actions, the computer program product comprising:
   one or more computer-readable hardware storage media and program instructions stored on the one or more computer-readable hardware storage media, the program instructions comprising:
   program instructions to determine a connectivity between one or more devices within a management inventory that are connected via a network;
   program instructions to determine a connectivity between the one or more devices within the management inventory after a proposed management action;
   program instructions to determine the one or more devices affected by the proposed management action;
   program instructions to send a query to the one or more devices affected by the proposed management action for specific impacts of the proposed management action;
   program instructions to receive data related to the specific impacts of the proposed management action from the one or more devices affected by the proposed management action.
   program instructions to compile the data related to the specific impacts of the proposed management action from the one or more devices affected by the proposed management action; and
   program instructions to display a warning of the specific impacts of the proposed management action from the one ore more devices affected by the proposed management action, wherein the warning displays the one or more devices affected by the proposed management action in a list in order of severity of the specific impacts.

6. The computer program product of claim 5, wherein the proposed management action is a deletion of a volume.

7. The computer program product of claim 5, wherein the proposed management action is a request to change a zone for an FC switch.

8. The computer program product of claim 5, further comprising:
   program instructions to determine that a user has clearance to allow the proposed management action to take place.

9. A computer system for determining the affects of management actions, the computer system comprising:
   one or more computer processors;
   one or more computer-readable hardware storage media;
   program instructions stored on the computer-readable storage media for execution by at least one of the one or more processors, the program instructions comprising:
   program instructions to determine a connectivity between one or more devices within a management inventory that are connected via a network;
   program instructions to determine a connectivity between the one or more devices within the management inventory after a proposed management action;
   program instructions to determine the one or more devices affected by the proposed management action;
   program instructions to send a query to the one or more devices affected by the proposed management action for specific impacts of the proposed management action;
   program instructions to receive data related to the specific impacts of the proposed management action from the one or more devices affected by the proposed management action;
   program instructions to compile the data related to the specific impacts of the proposed management action from the one or more devices affected by the proposed management action; and
   program instructions to display a warning of the specific impacts of the proposed management action from the one or more devices affected by the proposed management action, wherein the warning displays the one or more devices affected by the proposed management action in a list in order of severity of the specific impacts.

10. The computer system of claim 9, wherein the proposed management action is a deletion of a volume.

11. The computer system of claim 9, wherein the proposed management action is a request to change a zone for an FC switch.

12. The computer system of claim 9, further comprising:
    program instructions to determine that a user has clearance to allow the proposed management action to take place.

13. The method of claim 1, further comprising
    responsive to determining the one or more devices affected by the proposed management action, receiving additional information over the network from the one or more devices affected by the proposed management action.

14. The method of claim 13, wherein the additional information is one or more of the following:
    the access frequency of a volume or the last access time of device.

15. The computer program of claim 5, further comprising program instructions, stored on the one or more computer-readable hardware storage media, to:
    responsive to determining the one or more devices affected by the proposed management action, receive additional information over the network from the one or more devices affected by the proposed management action.

16. The computer program of claim 15, wherein the additional information is one or more of the following:
the access frequency of a volume or the last access time of a device.

17. The computer system of claim 9, further comprising program instructions, stored on the one or more computer-readable hardware storage media for execution by the at least one or the one or more computers, to:
responsive to determining the one ore more devices affected by the proposed management action, receive additional information over the network from the one or more devices affected by the proposed management action.

18. The computer system claim 9, wherein the additional information is one or more of the following: the access frequency of a volume the last access time of a device.

\* \* \* \* \*